C. O. NILSSON.
VALVE.
APPLICATION FILED JULY 10, 1914.
1,135,838.
Patented Apr. 13, 1915.
Fig. 1.
Fig. 2.
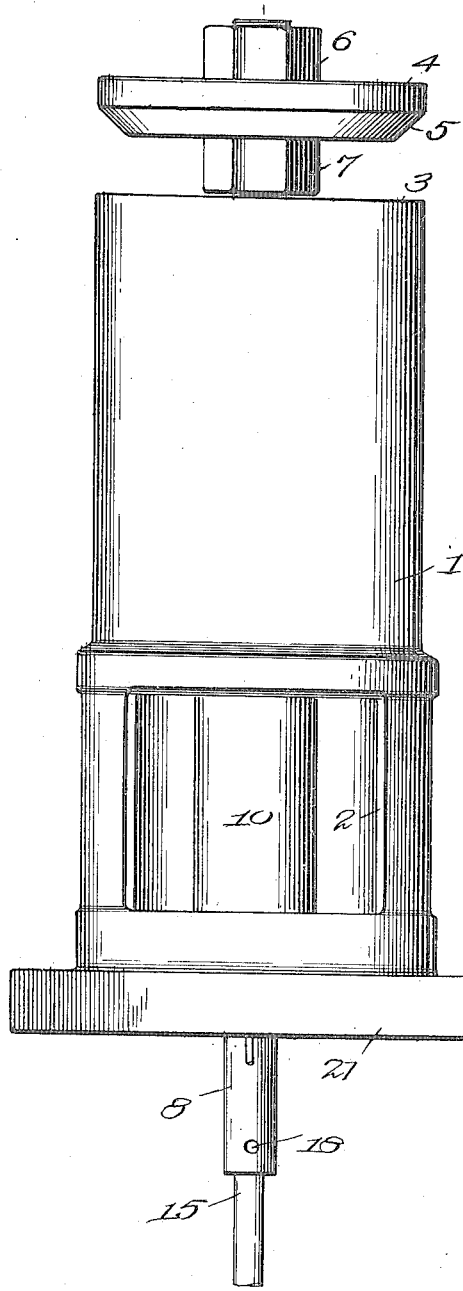
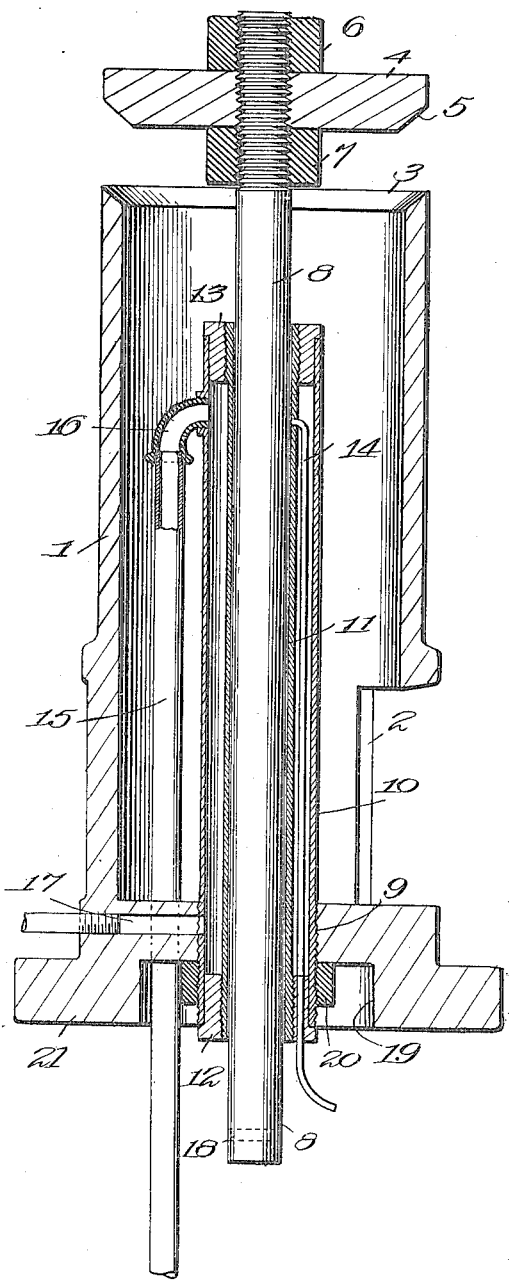
WITNESSES
INVENTOR
CARL O. NILSSON
BY
ATTORNEYS

UNITED STATES PATENT OFFICE.

CARL OSCAR NILSSON, OF RAVENSWOOD, WEST VIRGINIA.

VALVE.

1,135,838.      Specification of Letters Patent.      Patented Apr. 13, 1915.

Application filed July 10, 1914. Serial No. 850,154.

*To all whom it may concern:*

Be it known that I, CARL O. NILSSON, a citizen of the United States, and a resident of Ravenswood, in the county of Jackson and State of West Virginia, have made certain new and useful Improvements in Valves, of which the following is a specification.

My invention is an improvement in valves, and has for its object to provide a valve of the character specified, especially adapted for use as an exhaust valve in explosion engines, and especially of that type using the puppet type of valve.

In the drawings: Figure 1 is a front view of the improved valve, and Fig. 2 is a longitudinal section.

In the present embodiment of the invention the valve casing or cage 1 of approximately cylindrical form is provided with a lateral opening 2, and the inner end of the casing is open as shown, and is beveled internally, as indicated at 3, to form a seat for the valve 4. The inner surface of the valve 4 is beveled, as shown at 5, to fit the surface 3, and the said valve is held between lock nuts 6 and 7 on a valve stem 8.

The outer end of the casing or cage is provided with an internally threaded opening 9, and a tube 10 is threaded into the opening, the tube being concentric with the stem but of greater diameter, and extending from the outer end of the casing to near the inner end. A second tube 11 is arranged within the tube 10 and concentric therewith, the tube 11 encircling the stem loosely as shown.

Bushings 12 and 13 are arranged between the tubes 10 and 11, each bushing having an annular body engaging between the tubes, and having a threaded engagement with the inner tube, and an annular rib at its inner end fitting against the adjacent end of the tube 10. The tubes are thus held in rigid position and in spaced relation, and an oil tube 14 extends through the bushing 12 and between the tubes 10 and 11 to a point near the bushing 13, where the said oil tube has a lateral bend which engages an opening in the tube 11. Thus oil is furnished for lubricating the stem with respect to the inner tube.

A second tube 15 of larger size is passed through the outer end of the casing outside of the tube 10, and the tube 15 extends to near the bushing 13. Here an elbow 16 has one of its ends threaded into an opening in the outer tube 10, and the other end engages the adjacent end of the tube 15. The tube 15 is the water outlet tube, and the space or annular chamber between the two tubes 10 and 11 is designed to receive water.

The casing 1 is provided with a radial passage 17 near its outer end, registering with an opening in the outer tube 11 and leading to the space between the tubes 10 and 11, and this is the inlet for the water, the tube 15 being the outlet. The water enters by way of the passage 17 to the annular chamber between the tubes 10 and 11, and filling this space passes out at the elbow 16 and by way of the tube 15 to the source of supply.

The lower end of the stem 8 is provided with a transverse opening 18 for engagement by a spring, and the lower end of the casing 1 is recessed around the opening 9, as indicated at 19, and a lock nut or ring 20 is threaded on to the outer tube at its recess, for locking the outer tube in place. The casing is also provided with a marginal flange 21 at its lower end, for connection with the cylinder of the engine.

The portion of the valve stem adjacent to the cylinder is thus surrounded by cooling water, so that the heat from the valve will not heat the stem and the tube 11, to burn the oil that is supplied by way of the tube 14 to lubricate the stem. By supplying the oil in the manner shown, that is by way of the tube 14, which opens near the upper end of the bearing tube 11, the lubricant will lubricate practically the entire length of the stem, and not merely that portion adjacent to the cylinder.

The greatest diameter of the bushing 12 is less than the least diameter of the opening 9 through which the tubes are passed, so that the tubes 10 and 11 may be assembled before they are placed.

The usual cast iron guide for the valve stem may be omitted, and it was this guide that heated the oil. The improvement consists in applying a jacket to the stem for guiding the same, and arranging the jacket in such manner that a cooling fluid may be circulated through the same. It will be noticed that the outer end of the radial passage 17 is internally threaded, for engagement by a supply pipe or the like.

I claim:

1. In combination with the valve casing and the valve coöperating with the outer end thereof, the stem to which the valve is connected, the casing having an opening at its lower end through which the stem extends, and a guide for the stem, said guide comprising a tube fitting the stem, a second tube encircling the first tube and of greater diameter, bushings arranged between the tubes at the ends thereof, each bushing having a threaded engagement with the inner tube and having an annular marginal rib fitting the end of the outer tube, an oil tube extending through the innermost bushing and passing between the tubes to a point near the outermost bushing, said oil tube communicating with the space between the stem and the inner tube near the outermost bushing, the casing having a radial inlet leading to the space at the lower end of the casing, and a pipe leading through the space between the casing and the outer tube near the outermost bushing and extending longitudinally of the casing through the inner end thereof.

2. The combination with the valve casing and the valve coöperating therewith, the stem to which the valve is connected, said casing having an opening at its lower end through which the stem passes, and a guide for the stem, said guide comprising a pair of co-axial tubes spaced apart from each other, the inner tube fitting the stem, means at the ends of the tubes for connecting the same and for closing the space between the tubes, inlet and outlet pipes for supplying a cooling fluid to the space between the tubes, and an oil tube between the tubes and communicating with the space between the stem and the inner tube near the outer ends of the tubes.

3. The combination with the valve casing and the valve coöperating therewith, the stem to which the valve is connected, said casing having an opening at its lower end through which the stem passes, and a guide for the stem, said guide comprising a pair of co-axial tubes spaced apart from each other, the inner tube fitting the stem, means at the ends of the tubes for connecting the same and for closing the space between the tubes, means for permitting the circulation of a cooling fluid through the space between the tubes, and means for supplying oil to the inner tube near the upper end thereof.

CARL OSCAR NILSSON.

Witnesses:
C. T. KNENEAM,
H. F. WILLIAMS.

Copies of this patent may be obtained for five cents each, by addressing the "Commissioner of Patents, Washington, D. C."